United States Patent [19]

Kawanabe et al.

[11] Patent Number: 4,757,683
[45] Date of Patent: Jul. 19, 1988

[54] EXHAUST GAS RECIRCULATION METHOD FOR INTERNAL COMBUSTION ENGINES

[75] Inventors: Tomohiko Kawanabe; Katsuhiko Kimura; Masahiko Asakura; Takanori Shiina, all of Wako, Japan

[73] Assignee: Honda Giken Kogyo Kabushiki Kaisha, Tokyo, Japan

[21] Appl. No.: 911,129

[22] Filed: Sep. 24, 1986

[30] Foreign Application Priority Data

Sep. 25, 1985 [JP] Japan ................... 60-213378

[51] Int. Cl.$^4$ ............................. F02M 25/06
[52] U.S. Cl. ........................ 60/274; 60/278; 74/860; 123/571
[58] Field of Search ............. 60/274, 278; 74/860; 123/571

[56] References Cited

U.S. PATENT DOCUMENTS

| | | | |
|---|---|---|---|
| 4,165,722 | 8/1979 | Aoyama | 74/860 |
| 4,257,381 | 3/1981 | Yuzawa | 74/860 |
| 4,454,855 | 6/1984 | Otobe | 123/571 |
| 4,467,673 | 8/1984 | Hamada | 123/571 |
| 4,541,398 | 9/1985 | Kishi | 123/571 |
| 4,596,164 | 6/1986 | Hasegawa | 74/860 |

Primary Examiner—Douglas Hart
Attorney, Agent, or Firm—Lyon & Lyon

[57] ABSTRACT

The valve opening of an exhaust gas recirculating valve is controlled in response to operating conditions of the engine so as to regulate the amount of exhaust gas recirculation to values appropriate to the operating conditions of the engine. The valve opening of the exhaust gas recirculating valve is varied by a predetermined value when the engine is determined to be in a predetermined accelerating condition or a predetermined decelerating condition. Further, the predetermined value is corrected in accordance with the detected shift lever position. Preferably, the valve opening of the exhaust gas recirculating valve is increased or decreased by a predetermined incremental value or a predetermined decremental value when the engine is in the predetermined accelerating condition or the predetermined decelerating condition, and the predetermined incremental value or the predetermined decremental value is corrected in accordance with the detected position of the shift lever.

8 Claims, 4 Drawing Sheets ated in a carburetor and an exhaust gas recirculation control system, to which is applied the method according to the invention;

EXHAUST GAS RECIRCULATION METHOD FOR INTERNAL COMBUSTION ENGINES

BACKGROUND OF THE INVENTION

This invention relates to an exhaust gas recirculation method for internal combustion engines, and more particularly to a method of this kind which is adapted to vary the amount of exhaust gases through an exhaust gas recirculating valve in response to the shift lever position of the transmission.

An exhaust gas recirculation method, i.e. so-called EGR, which aims at reducing nitrogen oxides (NOx), emitted from an internal combustion engine, by returning part of exhaust gas from the engine to an intake passage thereof is known e.g. from Japanese Provisional Patent Publication (Kokai) No. 57-188753 which comprises previously setting required valve opening values of an exhaust gas recirculating valve arranged across an exhaust gas recirculating passage communicating between an exhaust passage and the intake passage, and storing them in storage means, reading one of the stored values from the storage means in response to values of a plurality of operating parameters of the engine (e.g. intake pipe absolute pressure at a zone downstream of a throttle valve and rotational speed of the engine) so as to obtain an optimal exhaust gas recirculation amount, and controlling the valve opening of the exhaust gas recirculating valve to a desired valve opening corresponding to the read required valve opening value. However, conventional exhaust gas recirculation methods of this kind described above, are not adapted to set required valve opening values appropriate to transient operating conditions of the engine such as acceleration and deceleration. As a result, for example, the amount of NOx is not reduced to a satisfactory low level due to an insufficient amount of recirculated exhaust gases during acceleration of the engine where NOx are emitted in large quantities, whereas during deceleration of the engine where the engine is in a somewhat unstable state, an excessive amount of recirculated exhaust gases degrades the combustion, resulting in degraded operational stability of the engine.

Therefore, it is required to increase and decrease the exhaust gas recirculation amount, respectively, during acceleration and deceleration of the engine. In effecting such increase and decrease of the exhaust gas recirculation amount, there is a problem encountered in effecting exhaust gas recirculation at a transient condition of the engine while the engine is cruising condition. That is, during high speed cruising of the engine where the vehicle in which the engine is installed is running at a constant high speed with the transmission set in a high speed shift lever position, conventionally the air-fuel ratio of the mixture supplied to the engine is leaned to curtail the fuel consumption since the engine is not required to produce high output during such high speed cruising. As a result, NOx are likely to be emitted in large quantity during high speed cruising. Therefore, it is desirable to set the exhaust gas recirculation amount to a large value for reduction of the amount of NOx during high speed cruising. Particularly at acceleration of the engine during high speed cruising it is desirable to increase the exhaust gas recirculation amount at a high rate for reduction of NOx as well as curtailment of fuel consumption. On the other hand, when the engine is decelerated during high speed cruising the exhaust gas recirculation amount should be reduced at a low rate to ensure satisfactory emission characteristics of the engine.

SUMMARY OF THE INVENTION

It is the object of the invention to provide an exhaust gas recirculation method for internal combustion engines, which is adapted to increase the exhaust gas recirculation amount when the engine is in a transient condition with the shift lever of the transmission in a high speed position during high speed operation of the engine to thereby reduce the amount of NOx emitted from the engine.

According to the invention, there is provided a method of controlling exhaust gas recirculation in an internal combustion engine having an exhaust passage, an intake passage, an exhaust gas recirculating passage communicating the exhaust passage with the intake passage, an exhaust gas recirculating valve arranged across the exhaust gas recirculating passage for regulating an amount of exhaust gas recirculated from the exhaust gas passage to the intake passage, and a transmission having a shift lever, wherein the valve opening of the exhaust gas recirculating valve is controlled in response to operating conditions of the engine so as to regulate the amount of exhaust gas recirculation to values appropriate to the operating conditions of the engine. The method is characterized by comprising the following steps: (1) determining whether or not the engine is in at least one of a predetermined accelerating condition and a predetermined decelerating condition; (2) varying the valve opening of the exhaust gas recirculating valve by a predetermined value when the engine is determined to be in at least one of the predetermined accelerating condition and the predetermined decelerating condition; (3) detecting a position of the shift lever of the transmission; and (4) correcting the predetermined value in accordance with the detected position of the shift lever.

Preferably, the predetermined value is corrected so as to increase the valve opening of the exhaust gas recirculating valve as the shift lever of the transmission is set to a higher speed position.

The above and other objects, features and advantages of the invention will be more apparent from the ensuing detailed description taken in conjunction with the accompanying drawings.

DETAILED DESCRIPTION

The method of the invention will now be described in detail with reference to the drawings.

Figure 1:
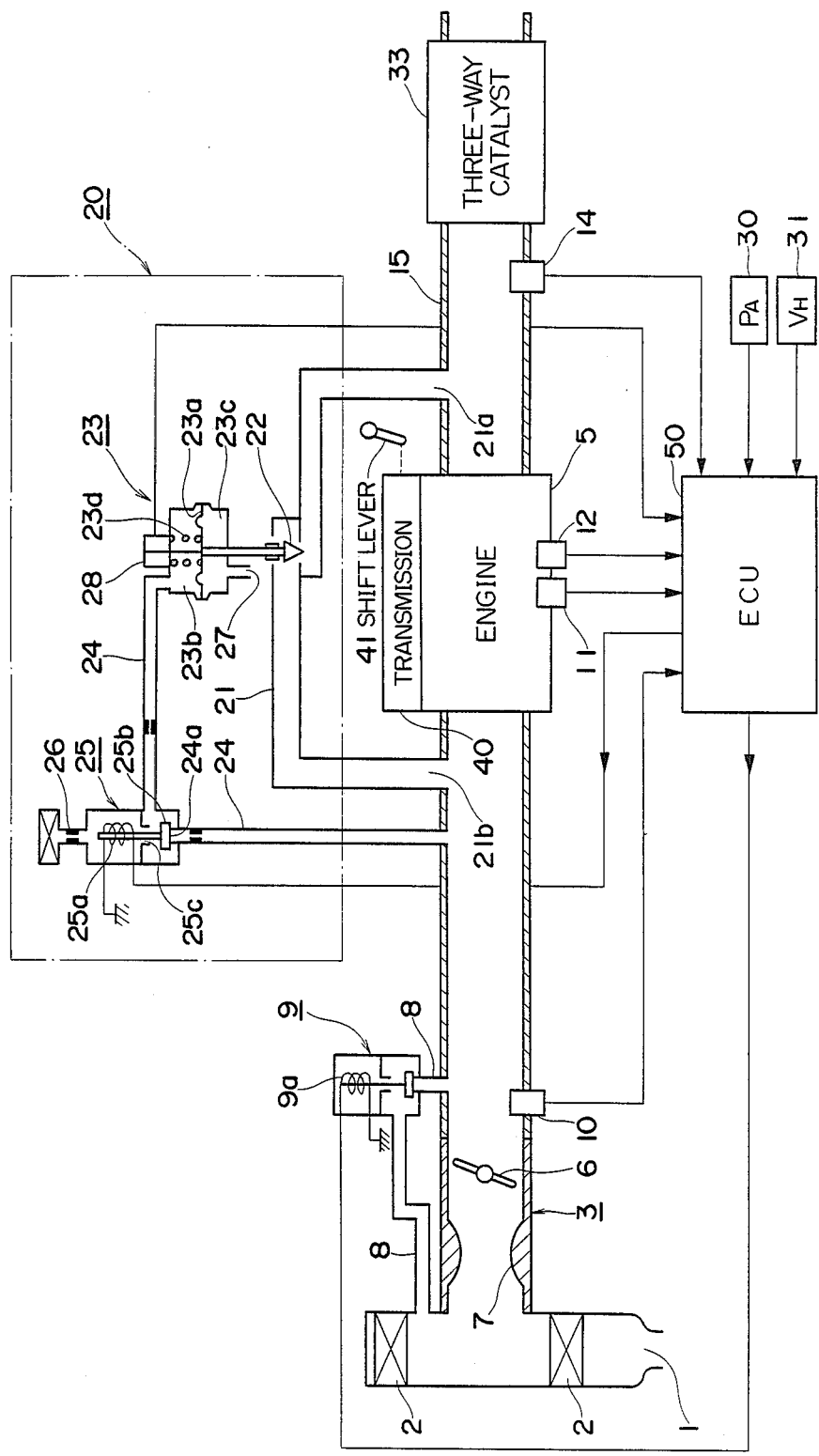
FIG. 1 is a diagram of the whole arrangement of an internal combustion engine equipped with a carburetor and an exhaust gas recirculation control system, to which is applied the method according to the invention.

FIG. 1 shows the whole arrangement of an internal combustion engine equipped with a carburetor and an exhaust gas recirculation control system, to which is applied the method according to the invention.

In FIG. 1, reference numeral 5 designates the internal combustion engine which may be a four-cylinder type, for instance. An intake pipe 4 of the engine 5 is provided with an atmospheric air intake port 1, an air cleaner 2, and a carburetor 3. A throttle valve 6 is arranged in the intake pipe 4 at a location downstream of a venturi 7 of the carburetor 3. Reference numeral 8 designates a secondary air supply passage 8, one end of which communicates with the air cleaner 2 arranged at a location upstream of the venturi 7, and the other end of which communicates with the intake pipe 4 at a location downstream of the throttle valve 6. Arranged across the secondary air supply passage 8 is a secondary air control valve 9 formed of an electromagnetic valve, which has a solenoid 9a connected to an electronic control unit (hereinafter called "the ECU") 50. The secondary air control valve 9 controls the quantity of secondary air supplied to the engine 5 by being energized and deenergized by the ECU 50. Further, an absolute pressure (PB) sensor 10 is connected to the intake pipe 4 at a location downstream of the throttle valve 6, to supply an output signal indicative of detected absolute pressure in the intake pipe 4 to the ECU 50.

An engine coolant temperature (TW) sensor 12, which may be formed of a thermistor or the like, is mounted on the body of the engine 5, in a manner embedded in the peripheral wall of an engine cylinder having its interior filled with cooling water, of which an electrical signal indicative of detected coolant temperature is supplied to the ECU 50.

An engine rotational speed (Ne) sensor 11 is arranged in facing relation to a camshaft, not shown, of the engine 5 or a crankshaft of same, not shown. The Ne sensor 11 is adapted to generate one pulse at one of predetermined crank angles of the engine each time the engine crankshaft rotates through 180 degrees. These pulse signals are supplied to the ECU 50.

A three-way catalyst 33 is arranged in an exhaust pipe 15 of the engine 5 for purifying ingredients HC, CO and NOx contained in the exhaust gases. An $O_2$ sensor 14 is inserted into the exhaust pipe 15 at a location upstream of the three-way catalyst 33 for detecting the concentration of oxygen in the exhaust gases and supplying an electrical signal indicative of detected oxygen concentration to the ECU 50.

Further connected to the ECU 50 is an atmospheric pressure (PA) sensor 30 to supply an electrical signal indicative of detected atmospheric pressure to the ECU 50. Also connected to the ECU 50 is a vehicle speed (VH) sensor 31 to supply an electrical signal indicative of detected speed of a vehicle in which the engine is installed, to the ECU 50.

An exhaust gas recirculation device 20 forming part of the exhaust gas recirculation control system will now be described.

An exhaust gas recirculating passage 21 of the device 20 is connected at one end 21a to the exhaust pipe 15 at a location upstream of the three-way catalyst 33, and at the other end 21b to the intake pipe 4 at a location downstream of the throttle valve 6. An exhaust gas recirculating valve 22 is arranged across the exhaust gas recirculating passage 21 for controlling the amount of exhaust gases being returned to the intake pipe 4. The exhaust gas recirculating valve 22 has its valve body operatively coupled to a diaphragm 23a of a negative pressure-responsive actuator 23. The actuator 23 has a negative pressure chamber 23b and a lower chamber 23c partly defined by the diaphragm 23a. A spring 23d is arranged in the negative pressure chamber 23b and urges the diaphragm 23a in the direction of closing the exhaust gas recirculation valve 22. The lower chamber 23c is in communication with the atmosphere by way of an air passage 27, while the negative pressure chamber 23b is in communication with the interior of the intake pipe 4 at a location downstream of the throttle valve 6 by way of a negative pressure passage 24 having restrictions therein. A three-way valve 25 formed of an electromagnetic valve is arranged across the negative pressure passage 24. When a solenoid 25a of the three-way valve 25 is energized, an opening 25c communicating with the atmosphere via an atmospheric pressure passage 26 provided with a filter and a restriction therein is closed and simultaneously the negative pressure passage 24 is opened, so that negative pressure developed in the intake pipe 4 at a zone downstream of the throttle valve 6 is introduced into the negative pressure chamber 23b of the negative pressure-responsive actuator 23. As a result, there will be developed a difference between pressures acting upon the opposite side surfaces of the diaphragm 23a so that the diaphragm 23a is displaced against the force of the spring 23d to open the exhaust gas recirculating valve 22. More specifically, with energization of the solenoid 25a of the three-way valve 25, the exhaust gas recirculation valve 22 has its valve opening increased to allow an increased amount of exhaust gases to flow through the exhaust gas recirculating passage 21 to the intake pipe 4. On the other hand, when the solenoid 25a of the three-way valve 25 is deenergized, the valve body 25b is displaced to close the opening 24a of the negative pressure passage 24 and simultaneously open the opening 25c so that the atmospheric pressure is introduced into the negative pressure chamber 23b of the negative pressure-responsive actuator 23. On this occasion, the pressure difference between pressures acting upon the opposite side surfaces of the diaphragm 23a becomes almost zero whereby the diaphragm 23a is displaced by the urging force of the spring 23d to bring the exhaust gas recirculating valve 22 into a fully closed position. As long as the solenoid 25a of the three-way valve 25 continues to be deenergized, the exhaust gas recirculation valve 22 is kept fully closed to interrupt the exhaust gas recirculation.

In FIG. 1, reference numeral 28 designates a valve lift sensor connected to the diaphragm 23a of the negative pressure-responsive actuator 23 for detecting the displacement of the diaphragm 23a, i.e. the actual valve opening of the exhaust gas recirculating valve 22. This sensor 28 is also electrically connected to the ECU 50.

The ECU 50 determines operating conditions of the engine on the basis of various engine operating parameter signals from the aforementioned sensors, obtains a valve opening command value LCMD from a required valve opening value LMAP for the exhaust gas recirculating valve 22, which is determined as a function of the intake pipe absolute pressure PBA and the engine rotational speed Ne, and supplies a control signal in the form of on-off pulses to the three-way valve 25 to energize same so as to make zero the difference between the valve opening command value LCMD and the actual valve opening value LACT of the exhaust gas recirculating valve 22. The ECU 50 also controls the quantity of secondary air supplied to the engine by changing the duty ratio of the secondary air control valve 9 in response to an output signal from the O₂ sensor 14, to thereby control the air-fuel ratio to a desired value.

In FIG. 1, reference numeral 40 designates a transmission, and 41 a shift lever of the transmission 40.

Figure 2:
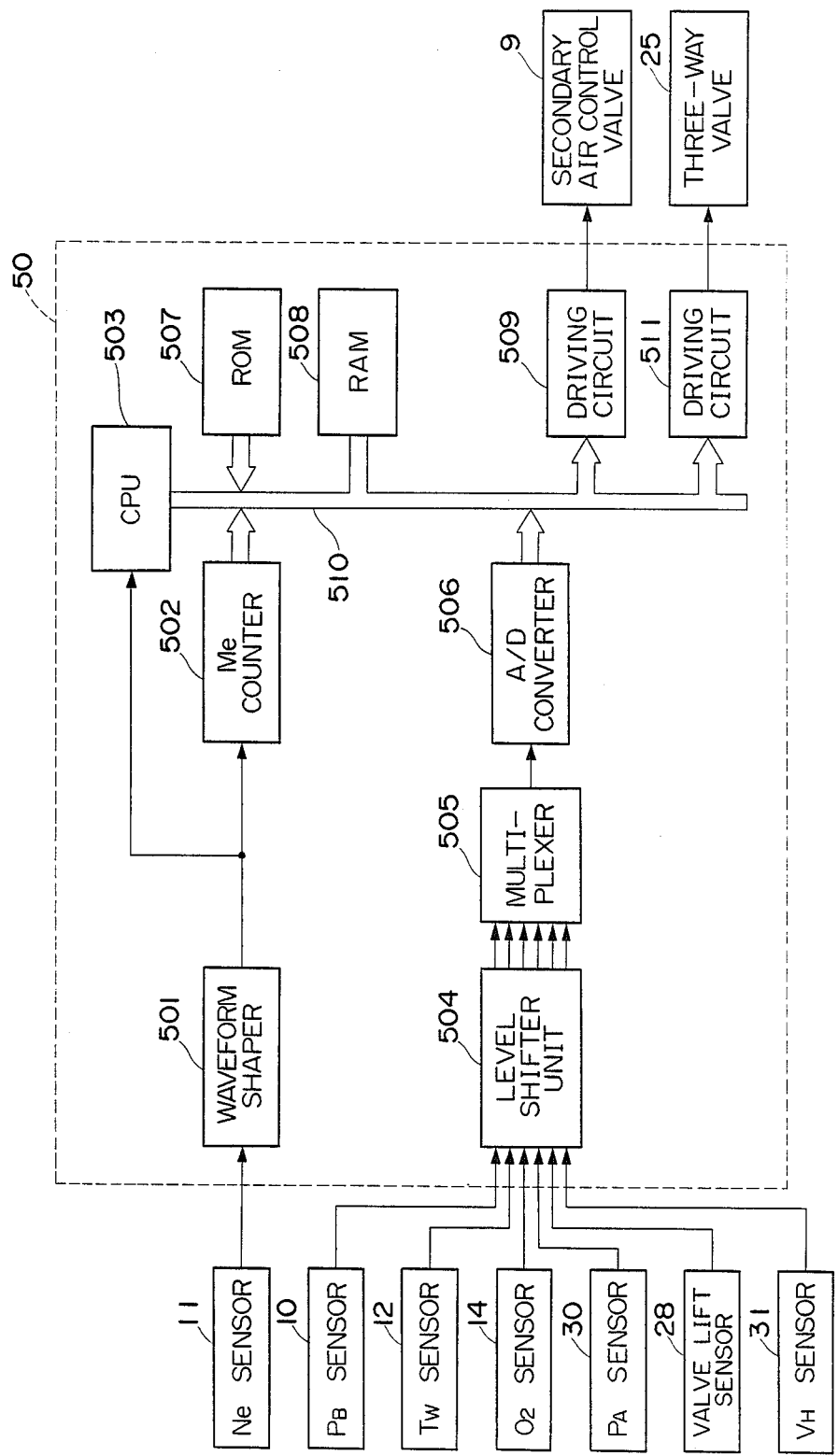
FIG. 2 is a circuit diagram of the internal construction of an electronic control unit (ECU) appearing in FIG. 1.

FIG. 2 shows an electrical circuit within the ECU 50 in FIG. 1. An output signal from the Ne sensor 11 is applied to a waveform shaper unit 501 to have its pulse waveform shaped, and the shaped signal is successively supplied to a central processing unit (hereinafter called "the CPU") 503 as an interrupt signal for starting execution of a program shown in FIG. 3, as well as to an Me value counter 502, as the TDC signal. The Me value counter 502 counts the time interval between an immediately preceding pulse of the TDC signal and a present pulse of the same signal, inputted thereto from the Ne sensor 11. Therefore, its counted value Me corresponds to the reciprocal of the actual engine rotational speed Ne. The Me value counter 502 supplies the counted value Me to the CPU 503 via a data bus 510.

Respective output signals from the absolute pressure (PB) sensor 10, the engine coolant temperature sensor 12, the O₂ sensor 14, the atmospheric pressure sensor 30, the valve lift sensor 28, the vehicle speed sensor 31, and other engine operating parameter sensors have their voltage level shifted to a predetermined voltage level by a level shifter unit 504 and successively applied to an analog-digital converter 506 through a multiplexer 505. The analog-digital converter 506 successively converts into digital signals analog output signals from the aforementioned various sensors, and the resulting digital signals are supplied to the CPU 503 via the data bus 510.

Further connected to the CPU 503 via the data bus 510 are a read-only memory (hereinafter called "the ROM") 507, a random access memory (hereinafter called "the RAM") 508, and driving circuits 509 and 511. The RAM 508 temporarily stores results of calculations effected within the CPU 503, while the ROM 507 stores the program for controlling the exhaust gas recirculation executed within the CPU 503, a valve lift map (FIG. 5), referred to later, as well as a program for controlling the secondary air quantity through the secondary air control valve 9.

The CPU 503 executes the control programs in such a manner that it determines operating conditions of the engine in response to output signals from the various engine operating parameter sensors, supply a control signal corresponding to the determined operating conditions to the driving circuit 511, which in turn supplies a corresponding driving signal to the three-way valve 25 to effect on-off control of same to thereby control the exhaust gas recirculation quantity, while it calculates the duty ratio of the secondary air control valve 9 in response to the output signal from the O₂ sensor 14 to supply a control signal corresponding to the calculated duty ratio to the driving circuit 509 through the data bus 510. The driving circuit 509 supplies a corresponding driving signal to the control valve 9 to energize same with the duty ratio corresponding to the calculated value.

Figure 3:
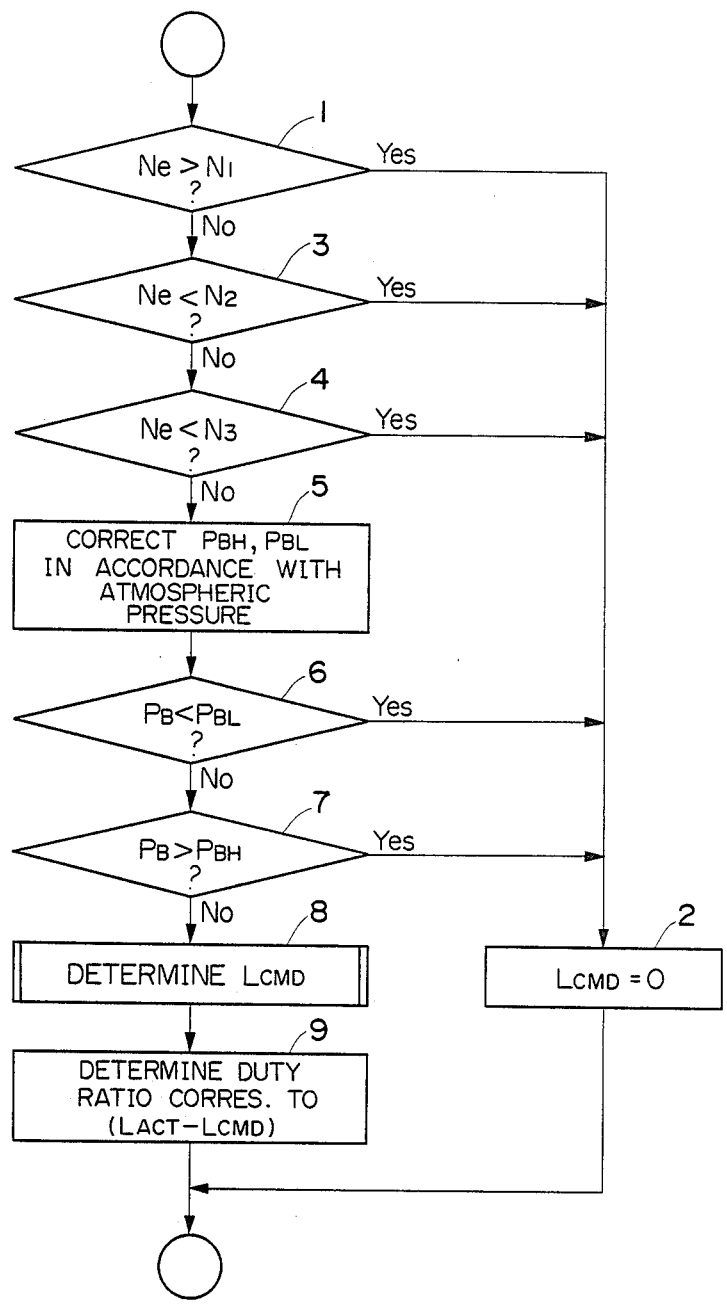
FIG. 3 is a flowchart showing a manner of controlling a three-way valve for exhaust gas recirculation by means of a central processing unit.

The exhaust gas recirculation control method according to the invention, i.e. a manner of controlling the three-way valve 25, executed by the CPU 503 in FIG. 2, will now be explained with reference to the flowchart of FIG. 3 wherein the program is executed in synchronism with generation of the TDC signal from the Ne sensor 11.

First, it is determined at step 1 whether or not the engine rotational speed Ne is higher than a predetermined value N1 (e.g. 4000 rpm). If the answer to the question of step 1 is affirmative or yes, the valve opening command value LCMD is set to 0 at step 2, followed by termination of the program. As a result, the three-way valve 25 is kept deenergized to interrupt the exhaust gas recirculation, whereby high engine output power is secured during high speed operation of the engine wherein the engine rotational speed is above the predetermined value N1 (4000 rpm). If the answer at step 1 is negative or no, the program proceeds to step 3.

At step 3, it is determined whether or not the engine rotational speed Ne is lower than a predetermined value N2 (e.g. 300 rpm). If the answer to the question of step 3 is affirmative or yes, the CPU executes the abovementioned step 2 to assure complete combustion when the engine is in a cranking condition, followed by termination of the program. If the answer at step 3 is negative or no, the program proceeds to step 4 wherein a determination is made as to whether or not the engine rotational speed Ne is lower than a predetermined value N3 (e.g. 650 rpm). If the answer to the question of step 4 is affirmative or yes, the CPU executes the step 2 whereby stable combustion can be assured during low speed operation of the engine, followed by termination of the program. If the answer at step 4 is negative or no, the program proceeds to step 5.

At step 5, predetermined absolute pressure values PBH, PBL, applied respectively at steps 6 and 7 to compare with the detected absolute pressure value PB, as will be described later, are corrected with respect to the atmospheric pressure so that the exhaust gas recirculation is interrupted depending upon the atmospheric pressure. The predetermined values PBH, PBL are set respectively at 700 mmHg and 200 mmHg under the standard atmospheric pressure. These values are corrected in response to the detected atmospheric pressure value PA by the following equations:

$$PBL = PA - (760 - PBL) = PA - 560$$

$$PBH = PA - (760 - PBH) = PA - 60$$

As is clear from the above equations, the predetermined values PBH, PBL are corrected to smaller values as the atmospheric pressure becomes lower.

It is determined at step 6 whether or not the detected absolute pressure value PB is smaller than the predetermined value PBL. If the answer to the question of step 6 is affirmative or yes, the CPU executes the step 2, whereby the exhaust gas recirculation is interrupted in a low load region of the engine to thereby assure stability of combustion and improve the driveability in the low load region. The program is terminated after executing step 6. If the answer at step 6 is negative or no, the program proceeds to step 7 wherein a determination is made as to whether or not the detected absolute pressure value PB is larger than the predetermined value PBH. If the answer to the question of step 7 is affirmative or yes, the CPU 503 executes the step 2 whereby the exhaust gas recirculation is interrupted in a high load region of the engine so as to avoid shortage of output power of the engine due to the exhaust gas recirculation in the high load region to thereby improve the driveabilty of the engine. Then, the program is terminated.

Figures 4, 5:
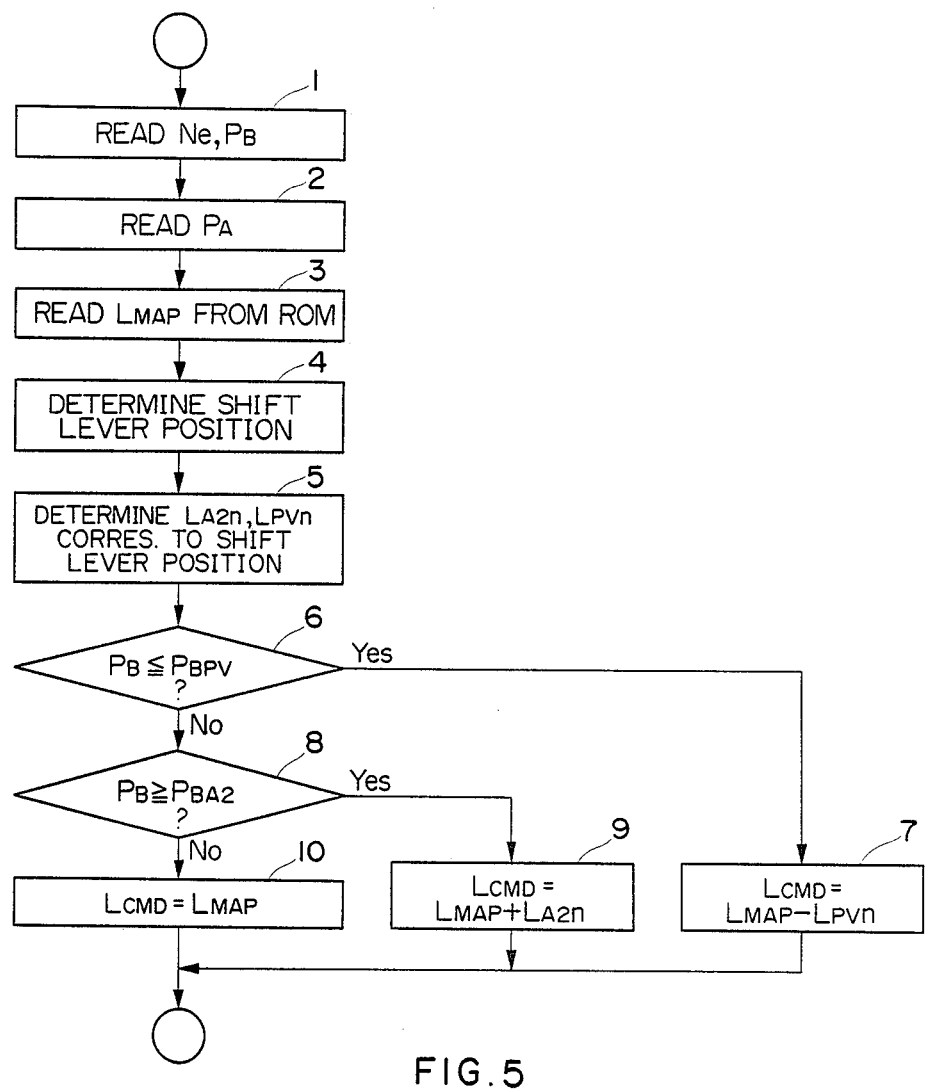
FIG. 4 is a flowchart showing a manner of determining a valve opening command value LCMD in response to engine operating parameters.
FIG. 5 shows a memory map of required valve opening values LMAP set as a function of the rotational speed of the engine and the intake pipe absolute pressure PB.

If the answer at step 7 is negative or no, the program proceeds to step 8 wherein the CPU 503 executes a subroutine for determining the valve opening command value LCMD, shown in FIG. 4, as described later. Then, the program proceeds to step 9 wherein the duty ratio of the three-way valve 25 is determined in accordance with the difference between the value LACT read from the lift sensor 28 and the valve opening command value LCMD determined at the above-mentioned step 8, followed by termination of the program.

The procedure of the subroutine for determining the valve opening command value LCMD executed at step 8 in FIG. 3 will now be explained with reference to FIG. 4.

First, the CPU 503 detects and reads output values from the Ne sensor 11 and the PB sensor 10 at step 1 and an output value from the PA sensor 30 at step 2. Then, at step 3, a required valve opening value LMAP is read from the valve lift map stored in the ROM 507 on the basis of the output values from the Ne sensor 11 and the PB sensor 10. In the valve lift map which is shown in FIG. 5, required valve opening values LMAP of the exhaust gas recirculation valve 22 are set as a function of the engine rotational speed Ne and the intake pipe absolute pressure PB, wherein, as shown in FIG. 5, there are provided ten predetermined values of the engine rotational speed Ne, i.e. N1–N10 ranging from 500 to 4000 rpm, and ten predetermined values of the intake pipe absolute pressure PB, i.e. PB6–PB15 ranging from 60 to 600 mmHg.

Next, at step 4 which of the shift lever positions, i.e. from first speed position to fifth speed position, the shift lever of the transmission is set to, is detected on the basis of the engine rotational speed Ne and the vehicle speed VH. Then, the program proceeds to step 5 wherein an incremental value LA2n of the exhaust gas recirculation amount and a decremental value Lpvn of the exhaust gas recirculation amount are selected respectively from among LA21 to LA25 and from among Lpv1 to Lpv5 in accordance with the detected shift lever position. These values LA2n and Lpvn are set such that the valve opening of the exhaust gas recirculating valve 22 becomes larger as the shift lever is set to a higher speed position. To be specific, as the shift lever is shifted to a higher speed position, the incremental value LA2n is set to a larger value and the decremental value Lpvn to a smaller value.

It is determined at step 6 whether or not the detected absolute pressure PB is lower than or equal to a predetermined value PBPV (e.g. 460 mmHg), that is, whether or not the engine is operating in a decelerating condition. If the answer to the question of step 6 is affirmative or yes, that is, if the engine is being decelerated, the program proceeds to step 7 wherein the valve opening command value LCMD is set to a value which is determined by subtracting the selected predetermined decremental value Lpvn from the required valve opening value LMAP read from the ROM 507 at step 3, followed by termination of the program.

On the other hand, if the answer at step 6 is negative or no, the program proceeds to step 8 wherein it is determined whether or not the detected absolute pressure value PB is higher than or equal to a predetermined value PBA2 (e.g. 610 mmHg), that is, whether or not the engine is operating in an accelerating condition. If the answer to the question of step 8 is affirmative or yes, that is, if the engine is being accelerated, the valve opening command value LCMD is set to a value determined by adding the selected predetermined incremental value LA2n to the required valve opening value LMAP read from the ROM 507, at step 9. If the answer at step 8 is negative or no, that is, if the engine is operating in a steady state, the program proceeds to step 10 wherein the valve opening command value LCMD is set to the required valve opening value LMAP rad from ROM 507 without correction. The program is terminated after executing step 9 or step 10.

As described above, according to the invention, the required valve opening value LMAP of the exhaust gas recirculating valve 22 is corrected in accordance with the shift lever position of the transmission to control the exhaust gas recirculation amount, such that the exhaust gas recirculation amount is increased as the shift lever position is set to higher speed positions. As a result, particularly when the engine is operating in a transient condition during high speed operation, i.e. in an accelerating condition during a constant high speed cruising condition, the exhaust gas recirculation amount can be increased at a sufficient rate, to thereby reduce the quantity of emitted NOx. On the other hand, when the engine is decelerated during the constant high speed cruising condition, the exhaust gas recirculation amount can be reduced at a small rate to thereby assure satisfactory emission characteristics of the engine during and immediately after deceleration.

Although in the foregoing embodiment whether the engine is in an accelerating condition and whether the engine is in a decelerating condition are determined by comparing the detected absolute pressure PB with the respective predetermined values PBPV, PBA2, this is not limitative, but accelerating and decelerating conditions of the engine may be determined by a change rate of a parameter indicative of load on the engine such as intake pipe absolute pressure PB, throttle valve opening $\theta$th, and engine rotational speed Ne.

What is claimed is:

1. A method of controlling exhaust gas recirculation in an internal combustion engine having an exhaust passage, an intake passage, an exhaust gas recirculating passage communicating said exhaust passage with said intake passage, an exhaust gas recirculating valve arranged across said exhaust gas recirculating passage for regulating an amount of exhaust gas recirculated from said exhaust gas passage to said intake passage, and a transmission having a shift lever, wherein the valve opening of said exhaust gas recirculating valve is controlled in response to operating conditions of said engine so as to regulate the amount of exhaust gas recirculation to values appropriate to the operating conditions of said engine, the method comprising the steps of (1) determining whether or not the engine is in at least one of a predetermined accelerating condition and a predetermined decelerating condition; (2) varying the valve opening of said exhaust gas recirculating valve by a predetermined value when the engine is determined to be in at least one of said predetermined accelerating condition and said predetermined decelerating condition; (3) detecting a position of said shift lever of said transmission; and (4) correcting said predetermined value in accordance with the detected position of said shift lever so as to increase the valve opening of said exhaust gas recirculating valve as said shift lever of said transmission is set to a higher speed position.

2. A method as claimed in claim 1, wherein the valve opening of said exhaust gas recirculating valve is increased by a predetermined incremental value when the engine is in said predetermined accelerating condition, and said predetermined incremental value is corrected in accordance with the detected position of said shift lever.

3. A method as claimed in claim 1, wherein the valve opening of said exhaust gas recirculating valve is decreased by a predetermined decremental value when the engine is in said predetermined decelerating condition, and said predetermined decremental value is corrected in accordance with the detected position of said shift lever.

4. A method as claimed in claim 2, wherein said predetermined incremental value is set to a larger value as said shift lever of said transmission is set to a higher speed position.

5. A method as claimed in claim 3, wherein said predetermined decremental value is set to a smaller value as said shift lever of said transmission is set to a higher speed position.

6. A method as claimed in claim 1, including the step of detecting a load on said engine, and wherein said engine is determined to be in said predetermined accelerating condition when the detected load on the engine is above a first predetermined value, and said engine is determined in said predetermined decelerating condition when the detected load on the engine is below a second predetermined value smaller than said first predetermined value.

7. A method as claimed in claim 6, wherein absolute pressure value in said intake pipe is detected as a parameter indicative of said load on the engine.

8. A method of controlling exhaust gas recirculation in an internal combustion engine having an exhaust passage, an intake passage, an exhaust gas recirculating passage communicating said exhaust passage with said intake passage, an exhaust gas recirculating valve arranged across said exhaust gas recirculating passage for regulating an amount of exhaust gas recirculated from said exhaust gas passage to said intake passage, and a transmission having a shift lever, wherein the valve opening of said exhaust gas recirculating valve is controlled in response to operating conditions of said engine so as to regulate the amount of exhaust gas recirculation to values appropriate to the operating conditions of said engine, the method comprising the steps of: (1) setting a value of the valve opening of said exhaust gas recirculating valve, which is appropriate to an operating condition in which said engine is operating; (2) detecting a position of said shift lever of said transmission; and (3) correcting said set value of the valve opening of said exhaust gas recirculating valve in accordance with the detected position of said shift lever so as to increase the valve opening of said exhaust gas recirculating valve as said shift lever of said transmission is set to a higher speed position.

* * * * *